US009280841B2

(12) United States Patent
Krajec

(10) Patent No.: US 9,280,841 B2
(45) Date of Patent: Mar. 8, 2016

(54) EVENT CHAIN VISUALIZATION OF PERFORMANCE DATA

(71) Applicant: Microsoft Technology Licensing, LLC, Redmond, WA (US)

(72) Inventor: Russell S. Krajec, Loveland, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 194 days.

(21) Appl. No.: 13/949,978

(22) Filed: Jul. 24, 2013

(65) Prior Publication Data

US 2015/0029193 A1   Jan. 29, 2015

(51) Int. Cl.
*G06T 11/20* (2006.01)

(52) U.S. Cl.
CPC .................................. *G06T 11/206* (2013.01)

(58) Field of Classification Search
CPC ...................................................... G06T 11/206
See application file for complete search history.

(56) References Cited

U.S. PATENT DOCUMENTS

| 5,293,620 | A | * | 3/1994 | Barabash et al. | 718/102 |
| 2002/0007297 | A1 | * | 1/2002 | Clarke | 705/8 |
| 2004/0117768 | A1 | | 6/2004 | Chang et al. | |
| 2005/0278208 | A1 | * | 12/2005 | Schultz | 705/8 |
| 2008/0092121 | A1 | | 4/2008 | DeRose et al. | |
| 2008/0126003 | A1 | | 5/2008 | Goldstein et al. | |
| 2010/0295856 | A1 | | 11/2010 | Ferreira et al. | |
| 2011/0209153 | A1 | * | 8/2011 | Suzuki et al. | 718/102 |
| 2013/0060372 | A1 | | 3/2013 | Lokowandt et al. | |
| 2014/0365545 | A1 | * | 12/2014 | Moffitt | 708/207 |

OTHER PUBLICATIONS

"International Search Report Issued in PCT Application No. PCT/US2014/011798", Mailed Date: Jun. 20, 2014, 3 pages.

* cited by examiner

*Primary Examiner* — Maurice L McDowell, Jr.
(74) *Attorney, Agent, or Firm* — Ben Tabor; Aaron Hoff; Micky Minhas

(57) ABSTRACT

An event chain visualization of performance data may show the execution of monitored elements as bars on a timeline, with connections or other relationships connecting the various bars into a sequential view of an application. The visualization may include color, shading, or other highlighting to show resource utilization or performance metrics. The visualization may be generated by monitoring many events processed by an application, where each bar on a timeline may reflect multiple instances of a monitored element and, in some case, the aggregated performance.

30 Claims, 5 Drawing Sheets

EVENT CHAIN VISUALIZATION OF PERFORMANCE DATA

BACKGROUND

Event chain visualizations, such as Gantt charts, are mechanisms that can illustrate connected items in a sequence. In the case of a Gantt chart, work items are illustrated as bars in a timeline, with each bar illustrating a length of time that a work item may take.

SUMMARY

An event chain visualization of performance related data may show monitored elements as bars or other shapes on a timeline, with connections or other relationships connecting the various bars into a sequential view of an application. The visualization may include color, shading, sparklines, sub-graphs, or other indicators to show resource utilization, performance metrics, or other data relating to the monitored elements. The visualization may be generated by monitoring many events, and each bar on a timeline may reflect multiple instances of a monitored element and, in some case, the aggregated performance of the multiple instances.

A timeline chart may represent multiple data sets gathered from multiple sequences of a process by placing sub-graphs within timeline bars. The sub-graphs may represent summarized data related to each event represented by a timeline bar. The timeline chart may present an overall view of a sequence of process steps with insights to the shape or distribution of the underlying observations. The timeline chart may be an instance of an event chain diagram, where the elements within the event chains are displayed with respect to time. The timeline chart may be presented as representing the aggregated dataset of multiple runs, as well as a representation of a single observed sequence. In both cases, sub-graphs may be included in a timeline bar to represent different views of the aggregated dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Event Chain Visualization of Performance Data

Figure 1A:
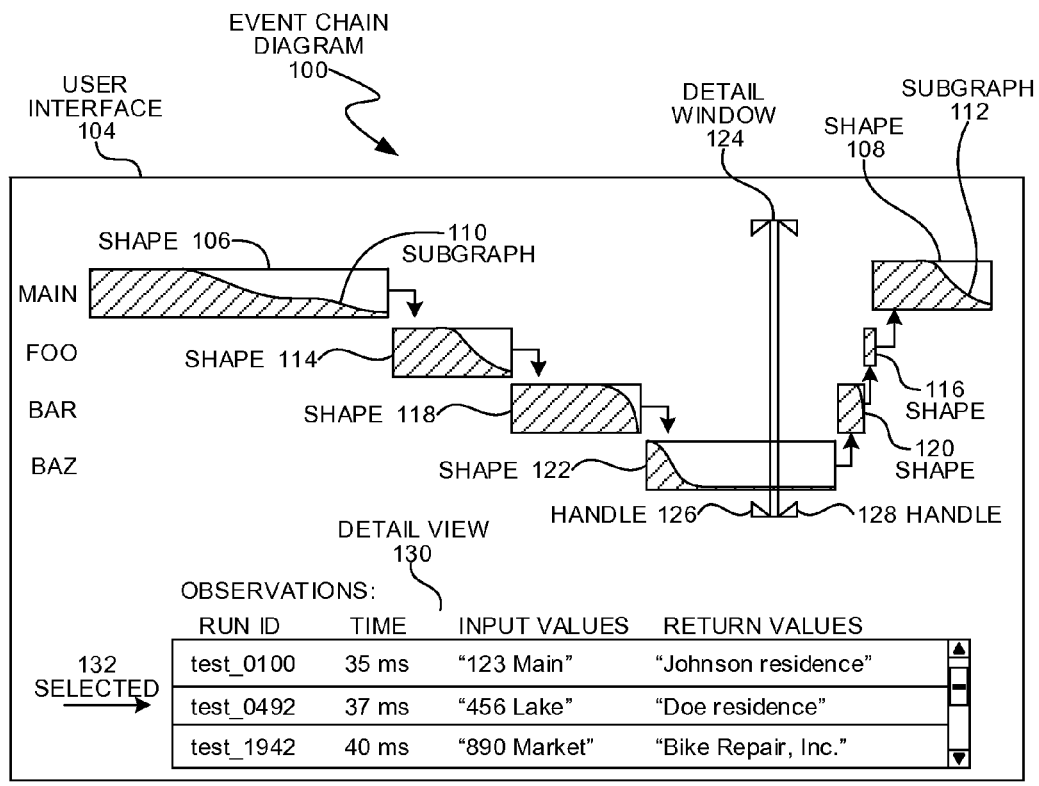
FIG. 1A is a diagram illustration of an example embodiment showing an event chain diagram showing aggregated data.

An event chain visualization of monitored data may render shapes representing monitored data for individual monitored elements. The shapes may be arranged in an event chain, with each shape having at least one dimension representing a measured or observed performance metric. The shapes may be connected with connectors, such as arrow lines, to visually illustrate relationships between the monitored elements.

The dimension may represent a maximum, minimum, average, median, or some other observation of the data. The parameter being measured may be time or some other resource.

The performance data may be observations of monitored elements that may be gathered when an application or other code has been executed. The observations may include multiple observations of the same monitored element, which may be represented in summary form in a shape representing the element.

The dimension of the shape representing a monitored element may give an instant, graphical representation of a single observed parameter. The relative dimension of one monitored element representation with another monitored element representation may show a user the relative proportion of the parameter at a glance.

Further, the relationships between monitored elements may be arranged in a sequential manner. The relationships may show dependencies, shared memory objects, or other relationships in a manner that can be quickly grasped.

In one use, a timeline chart or Gantt chart representation of an event chain may arrange shapes representing the time to process each monitored element, and arranged in sequential order as time progresses. Because each bar in a timeline chart may represent the maximum, minimum, or other observation, the horizontal length of the overall timeline chart may not represent any actual observed runs.

Additional data may be shown within the shape representing a monitored element. The additional data may include observation distributions in the form of line graphs, bar graphs, sparklines, variable shading, variable widths, or some other form. Such additional data may be useful to identify outliers or trends in the data, where the trends may be otherwise masked summarized statistics or single representative observations.

The event chain visualization may have a generalized view which may represent many sets of performance data, and a detailed view which may represent a single set of performance data along with a generalized view.

The detailed view may include representations of the generalized data set through the use of sparklines, sub-graphs, or other indicators, which may be presented to show both the detailed data of a single data set was well as the context of the single data set with respect to the larger, aggregated and summarized data set.

Throughout this specification and claims the term "timeline graph" and "timeline diagram" are used interchangeably. These terms are also used to denote a special case of an event chain diagram where the events are arranged with respect to time. In a typical timeline diagram, the horizontal axis of a graph may represent time. Other timeline diagrams may be oriented such that time may be represented on a vertical axis or some other direction.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1B:
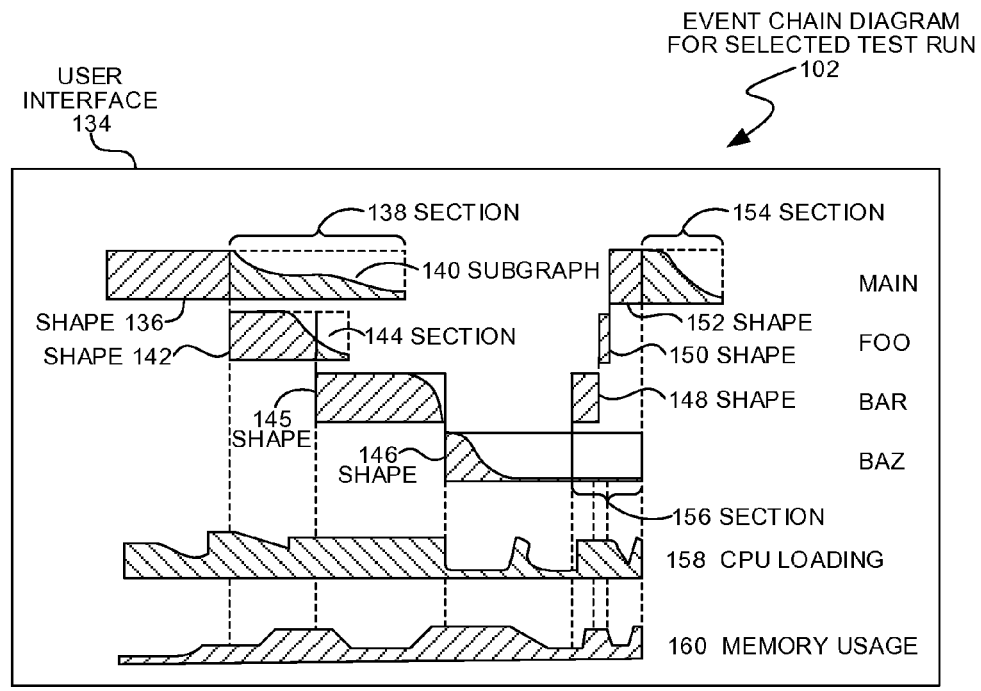
FIG. 1B is a diagram illustration of an example embodiment showing an event chain diagram showing a selected data set, as well as aggregated data.

FIG. 1A is an illustration of an example embodiment 100 showing an event chain diagram. FIG. 1B is an illustration of an example embodiment 102 showing a detailed view of a single data set from embodiment 100.

Embodiment 100 illustrates an event chain diagram that may represent multiple sets of performance data. In the example of embodiment 100, tracer data from a fictitious application is shown. The application may contain four distinct code elements, named MAIN, FOO, BAR, and BAZ. The tracer data may include performance data gathered from multiple runs of the application, with the data comprising processing time, CPU loading, memory consumption, and other data elements in our example.

The event chain diagram may show summarized data from multiple data sets in at least two manners. In the first manner, the size of the shapes in the event chain diagram may reflect a summarized statistic for each of the code elements that were observed. The summarized statistic may be, for example, maximum time taken to process the code element represented by the shape as may be represented in the example of embodiment 100.

In the examples of FIGS. 1A and 1B, the horizontal axis of the various shapes and diagrams may represent time.

The event chain diagram of embodiment 100 may show the worst case timeline from the performance data. In other words, the shapes may be sized to represent the longest time observed for each code element, then placed together in sequential relationships such that the overall length of the diagram may or may not reflect the length of the worst case data set.

The summarized statistic represented by the horizontal length of the various shapes may be any summarization or representation of the underlying data. In the example of embodiment 100, the representation may be the maximum value of any observation. Other examples may use a maximum, minimum, median, mean, standard deviation, multiples of the standard deviation, or some other summarization or observation to represent an element in an event chain diagram.

Within each shape representing a code element, a sub-graph may be included. The sub-graphs may give additional information about the underlying data, and may give the user a sense of the profile of the data distribution. In many cases, the distribution profile may show the user if many of the observations were tightly clustered, identify outliers, or other indicators about the data.

Shapes 106 and 108 may represent the observations of a function named MAIN, when MAIN was invoked two times. Shape 106 may represent the first instances MAIN was invoked, and shape 108 may represent the second instance.

A sub-graph 110 may illustrate a distribution of the observations collected for the first instance of MAIN. The sub-graph 110 may be show the cumulative number of observations that had a given length of time, as represented by the horizontal axis. The shape of sub-graph 110 illustrates that all the observations were at least as long as about ⅓ of the total length of time, and that there is a wide variation in data points as time increases.

The sub-graph may be a sparkline or other small graphical representation of the underlying data. The sub-graph may take on many forms, examples of which may be found in embodiment 300 presented later in this specification.

The sequence of items in the event chain diagram may start with shape 106, then proceed to shape 114 representing the function FOO, shape 118 representing the function BAR, shape 122 representing the function BAZ, and back to shape 116 representing BAR, shape 116 representing the function FOO, and finally at function MAIN with shape 108. The sequence of items may represent the flow of control, data items, or other connections between the various items.

Within each shape, a sub-graph may illustrate some aspect of the underlying data. From examination of the example, shape 122 may illustrate an example of a sub-graph that may represent a dataset that contains a very wide distribution of data elements, with the possibility that there may be outliers on the high end of the scale.

A detail window 124 may be an interactive element by which a user may browse the underlying data in more detail. The detail window 124 may be moved back and forth using handles 126 and 128, which may be moved by clicking and dragging the handles. The detail window 124 may be expanded, contracted, and moved to different locations across the event chain diagram, and the underlying data may be presented in a detail view 130.

The detail view 130 may illustrate some of the underlying data that may be represented by the detail window 124. In the example, the selected observations may be displayed by RUN_ID, time, input values, and return values. Through the user interface 104, a user may be able to scroll through the various data elements and select an element for a detailed view. In the example, the selected element 132 is shown.

FIG. 1B may illustrate an event chain diagram 102 that shows the detail of the selected element 132. The event chain diagram 102 may include some elements from the event chain diagram 100, but arranged in a manner to show the details of the selected element 132.

The various shapes in diagram 102 may be arranged to reflect the selected element 132. The sequence of events may be shown by shape 136 connected to shape 142, which is connected in succession to shapes 145, 146, 148, 150, and finally shape 152.

The size of the shapes and the positioning of the subsequent shape may indicate the actual length of time observed for the selected dataset. In order to illustrate the entire dataset, the shapes may be shaded, greyed out, differently colored, or have some other visual effect that may show the larger dataset.

For example, shape 136 may have a section 138 that may be greyed out, but may still contain a sub-graph 140. The left hand side of the shape 136 that may not be greyed out may represent the value of the underlying data in the selected element 132, while the remaining section 138 may give the user a visual hint as to where the selected element 132 fell in the distribution represented by the sub-graph 140.

Shape 142 may be illustrated with section 144 greyed out, as shape 146 may also be illustrated with section 156 greyed out and shape 152 may be illustrated with section 154 greyed out. With each of the shapes that have greyed out portions, a user may be able to determine where the selected data set fell within the distribution of each observation. Such an illustration may communicate contextual data while also communicating detailed data about a specific set of observations.

Graphs representing CPU loading 158 and memory usage 160 may also be included in the diagram 102. The CPU loading 158 and memory usage 160 may be additional sets of data may match the timeline of the event chain diagram 102 and may relate to the selected element 132.

In the example of embodiments 100 and 102, the each shape has a dimension that may be scaled to represent a certain data element. In the case of the examples, such a dimension may be related to time. Other examples may relate the dimension to any other measured or observed parameter.

Figure 2:
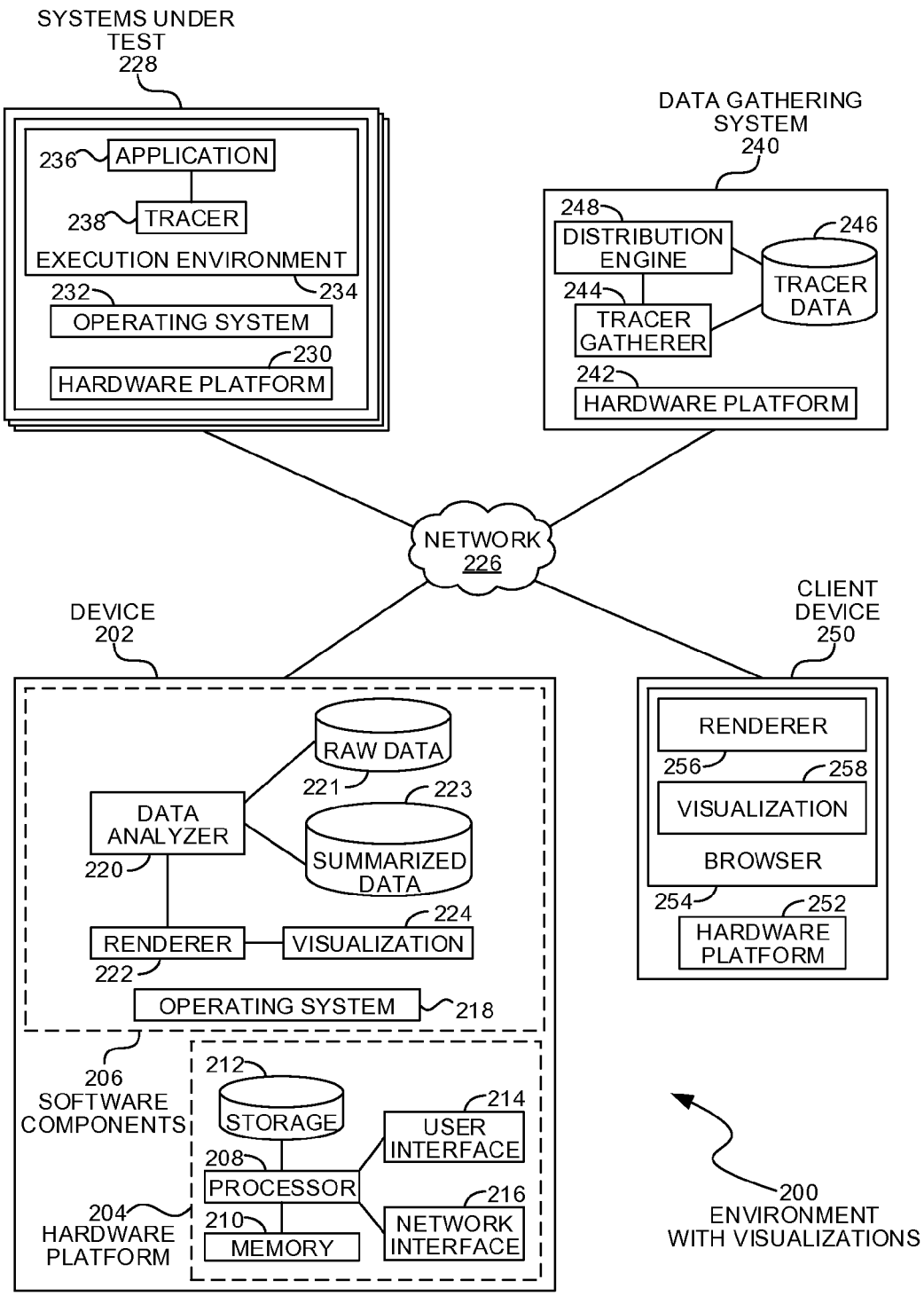
FIG. 2 is a diagram illustration of an embodiment showing a network environment with devices that may create and view tracer data.

FIG. 2 is a diagram of an embodiment 200 showing components that may generate performance data and display the performance data using an event chain diagram. The example of embodiment 200 is merely one example of a multi-device system that may generate performance data and display the data in an event chain diagram. Other architectures may include single device and multiple device architectures.

A single device architecture may gather performance data, analyze the data, and graphically display the data or perform bottleneck detection.

A multiple device architecture may divide different components of the data gathering and analysis functions over different devices. The multiple device architecture may be one way to deliver complex tracing services without having to install and maintain all of the various tracing components on a single system.

The example of embodiment 200 gathers tracer data from several systems under test, then generates and renders an event chain diagram as a visualization. The tracer data may be a large amount of historical data, which may be summarized in an event chain diagram, as well as viewed using a detailed event chain diagram that may include summarized data from multiple data sets while viewing one data set.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

A data analyzer 220 may analyze raw data 221 and generate summarized data 223 that may be consumed by a renderer 222 to generate a visualization 224. The raw data 221 may be any type of data that contains elements that may be related to each other so as to be displayed on an event chain diagram.

In an event chain diagram, several elements may be displayed with relationships to each other. A common example may be a Gantt chart that may show work items of a project, where various work items may be connected by dependencies. The elements may be presented with contextual data in the form of sparklines or sub-graphs. Such event chain diagram may present summarized data or data from a single run of a measured process.

The summarized data may aggregate multiple runs of a measured process, where each run may be a separate data set representing a single run through the process. One example of such a data set may be tracer data, which may be gathered by monitoring an application over time. While a tracer gathers data, an application may be subjected to multiple inputs, each of which may cause the application to execute code elements in a process that may be displayed in an event chain diagram.

The example of embodiment 200 illustrates a system where tracer data may be collected, processed, and visualized. Other systems may gather, process, and visualize data for other types of processes or sequences.

The device 202 may create visualizations 224 which may be viewed on the device 202 or on another device. In some cases, the visualizations may be static visualizations, while in other cases, the visualizations may be interactive such that a user may be able to explore, browse, and otherwise interact with the data.

A network 226 may connect a group of systems under test 228 from which observations and measurements may be taken. Each of the systems under test 228 may have a hardware platform 230, which may be similar to the hardware platform 204 of the device 202. The systems under test 228 may have an operating system 232 on which an execution environment 234 may run. Within the execution environment 234, an application 236 may be executed with a tracer 238. The tracer 238 may monitor, measure, probe, instrument, or otherwise gather data while the application 236 executes.

The tracer 238 may transmit the collected data to a data gathering system 240. The data gathering system 240 may have hardware platform 242 which may be similar to the hardware platform 204 of the device 202. A tracer gatherer 244 may collect and store tracer data 246 from the various tracers 238. A distribution engine 248 may be a communications portal through which other systems may access the tracer data 246, such as the data analyzer 220 of the device 202.

A client device 250 may be an example of a device that may render and visualize the data. In such an example, some or all of the summarization or processing of the tracer data may be performed on another device, such as the device 202.

The client device 250 may have a hardware platform 252 which may be similar to the hardware platform 204 of device 202. A browser 254 may execute code that operates as a renderer 256 to show a user the visualization 258. In some cases, the visualization 258 may be presented in a browser, where the renderer may execute on the device 202. Such a case may create a visualization 224 on the device 202, and an image from the renderer 222 may be transmitted and displayed by the browser 254.

Figure 3:
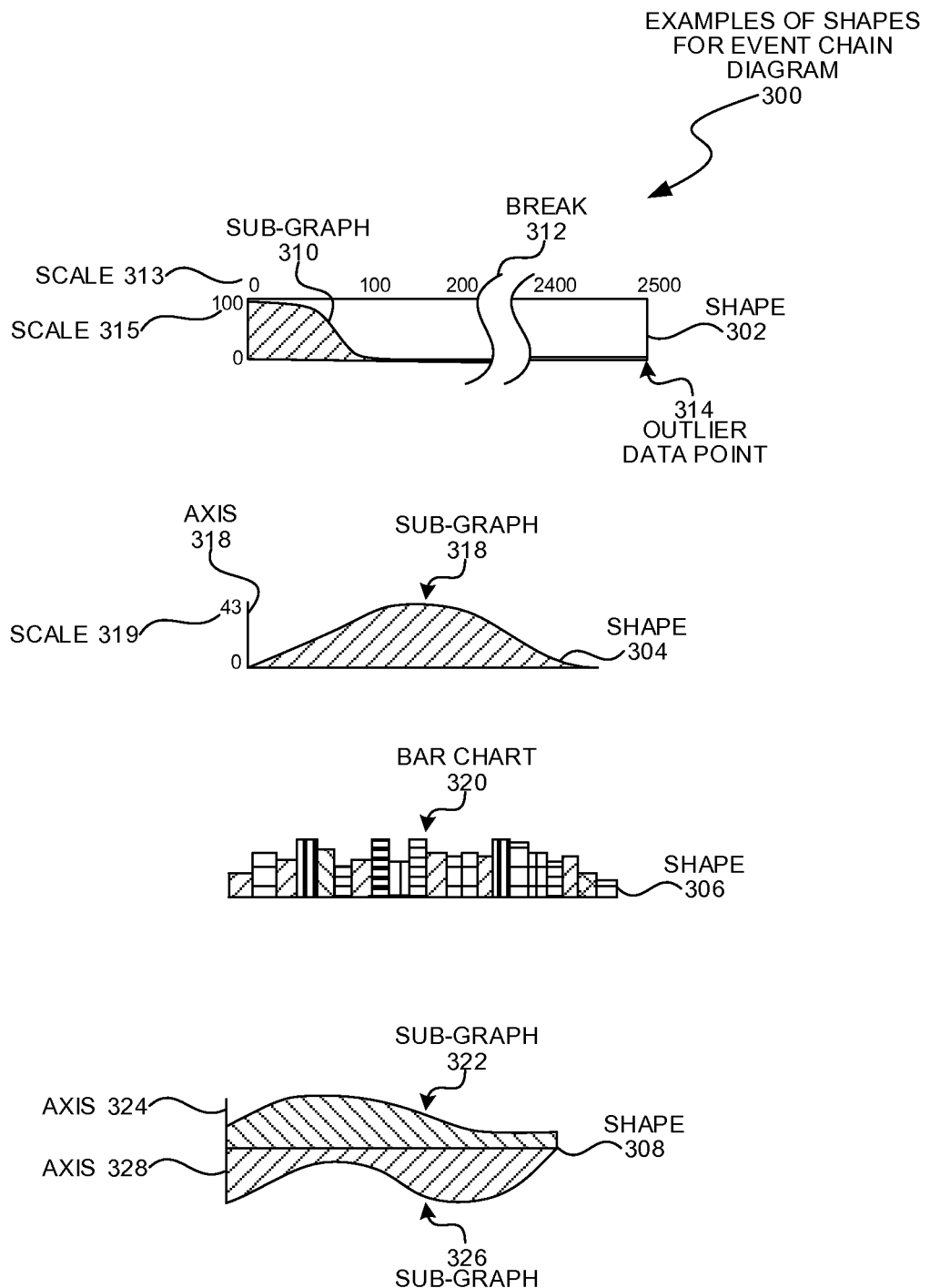
FIG. 3 is a diagram illustration of several example embodiments showing sub-graphs that may be applied to different shapes.

FIG. 3 is a diagram illustration of an embodiment 300 showing several examples of shapes that may be used to represent an element in an event chain diagram, such as the event chain diagrams illustrated in FIGS. 1A and 1B.

The examples of shapes 302, 304, 306, and 308 are examples where the underlying shape may be a rectangle or line. In each of the examples, the shapes may be illustrated with the horizontal axis as the dimension sized to represent a data value.

Shape 302 is an example of a shape that may be broken such that the length of the shape may not represent the full value of the data element it may represent. The shape 302 may have a sub-graph 310 that may contain an outlier data point 314. Because the outlier data point 314 may cause the shape 302 to be very large, a break 312 may be inserted and the length of the shape 302 may be condensed. The break 312 may indicate that the length of the shape 302 may have been shortened.

The shape 302 may have a scale 313 on the horizontal axis. The scale may help a user understand the actual values of the underlying data. Because of the break 312, the scale 313 may be a visual indicator of how much the shape 302 may have been shortened by the break 312.

Shape 304 is an example of a shape that may have a different type of sub-graph 318. The shape 304 may be a line to which a sub-graph 318 may be attached. The sub-graph 318 may have an axis 316. The axis 316 may be perpendicular to the horizontal length of the shape 304. The axis 316 may have a scale 319. In some cases, a vertical axis may not have a scale.

The sub-graph 318 may show a distribution of the underlying data. The sub-graph 310 of shape 302 may be an example of a cumulative distribution, whereas the sub-graph 318 of shape 318 may be a conventional distribution illustration. A cumulative distribution may be useful in some cases where outliers may exist on one end of the distribution, while a conventional distribution may be useful when outliers may exist on both ends of the distribution.

Shape 306 is an example with a sub-graph that may be a bar chart 320. The bar chart 320 may include one bar for each data set or may represent groups of data sets.

Shape 308 is an example of a shape with two sub-graphs. Sub-graph 322 may be shown on the top with axis 324, while sub-graph 326 may be shown with axis 328. The axes may be illustrated with values or without values.

Figure 4:
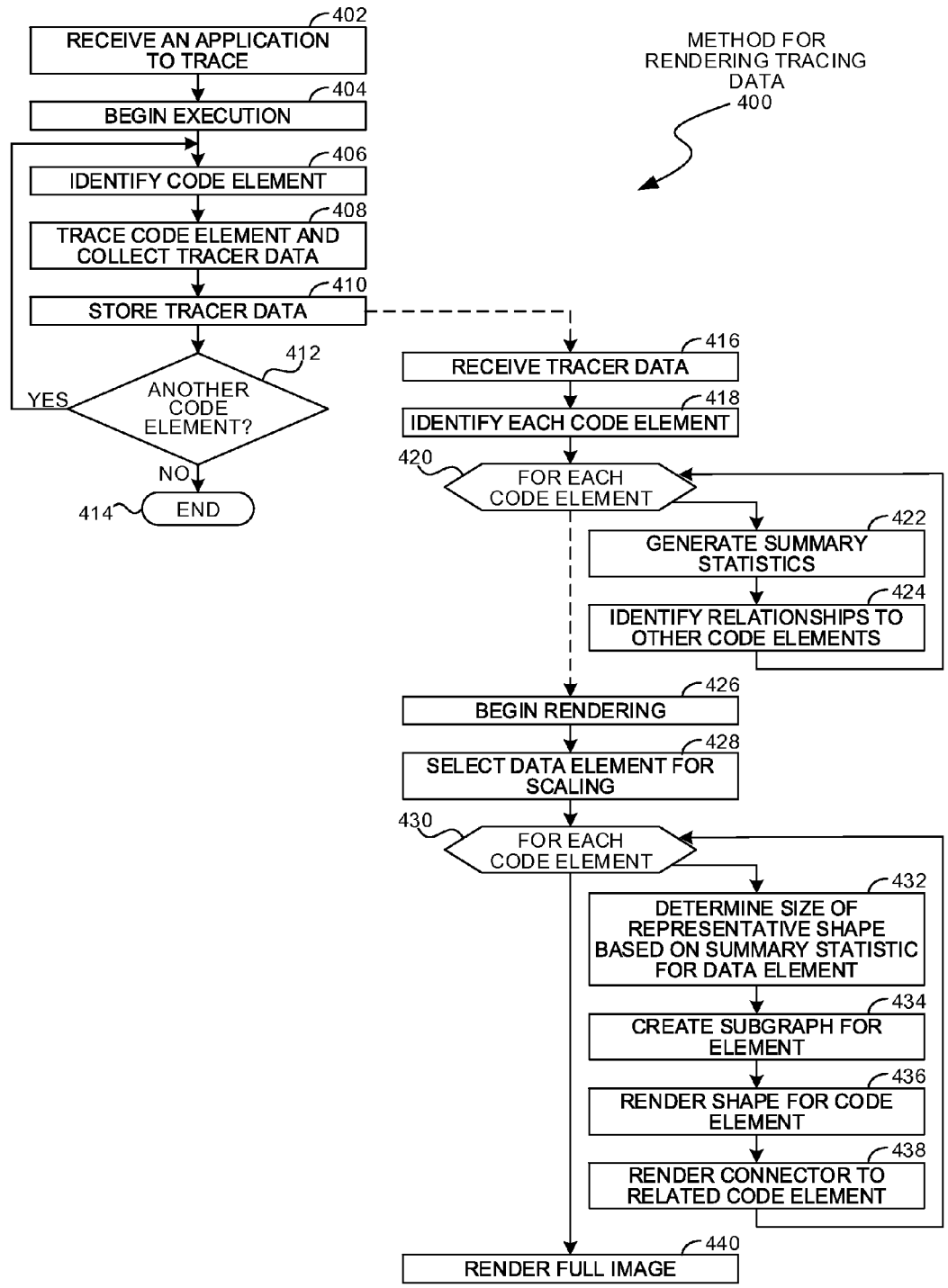
FIG. 4 is a flowchart illustration of an embodiment showing a method for creating an event chain diagram for an aggregated view of multiple data sets.

FIG. 4 is a flowchart illustration of an embodiment 400 showing a method for generating data, processing the data, and rendering a graph illustrating the data. The operations of embodiment 400 may illustrate the operations that may be performed with the components of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may illustrate a method by which data may be generated by tracing an application. Once the tracer data has been stored, the tracer data may be summarized and rendered in a visualization, such as an event chain diagram. Examples of such diagrams may be found in FIGS. 1A and 1B.

An application may be received in block 402 for tracing. Execution may begin in block 404. A code element may be identified in block 406 and the code element may be traced in block 408 to collect tracer data, which may be stored in block 410. When another code element is encountered in block 412, the process may loop back to block 406. When all the code elements have been executed in block 412, the data collection process may end in block 414.

The tracer data may be any data gathered while the application executes. Such data may include observations about start time and end time, as well as resource consumption data, data regarding the performance of the code element, or any other data.

The tracer data may be received in block 416. Each code element in the tracer data may be identified in block 418 and processed in block 420.

For each code element in block 420, summary statistics may be generated in block 422 and relationships to other code elements may be identified in block 424.

After generating summary statistics, rendering may begin in block 426.

A data element may be selected in block 428 for scaling. The data element may be the dimension for which the overall graph may be scaled. In the examples of FIGS. 1A and 1B, the dimension may be time.

For each code element in block 430, a size of a representative shape may be determined in block 432. The size may be determined from the summary statistic, which may be the maximum value of an observation of the code element. In other embodiments the minimum, average, mean, or some other representative observation may be used.

A sub-graph may be created for the element in block 434. The sub-graph may be any representation of the underlying data for the code element represented by the shape. The sub-graph may be a distribution of the underlying data or some other representation of the underlying data, which may be aggregated from multiple observations of the code element.

The shape may be rendered in block 436. A connector may be rendered in block 438 to graphically connect the block to any other blocks to which a relationship may be found.

The entire image may be rendered in block 440.

Figure 5:
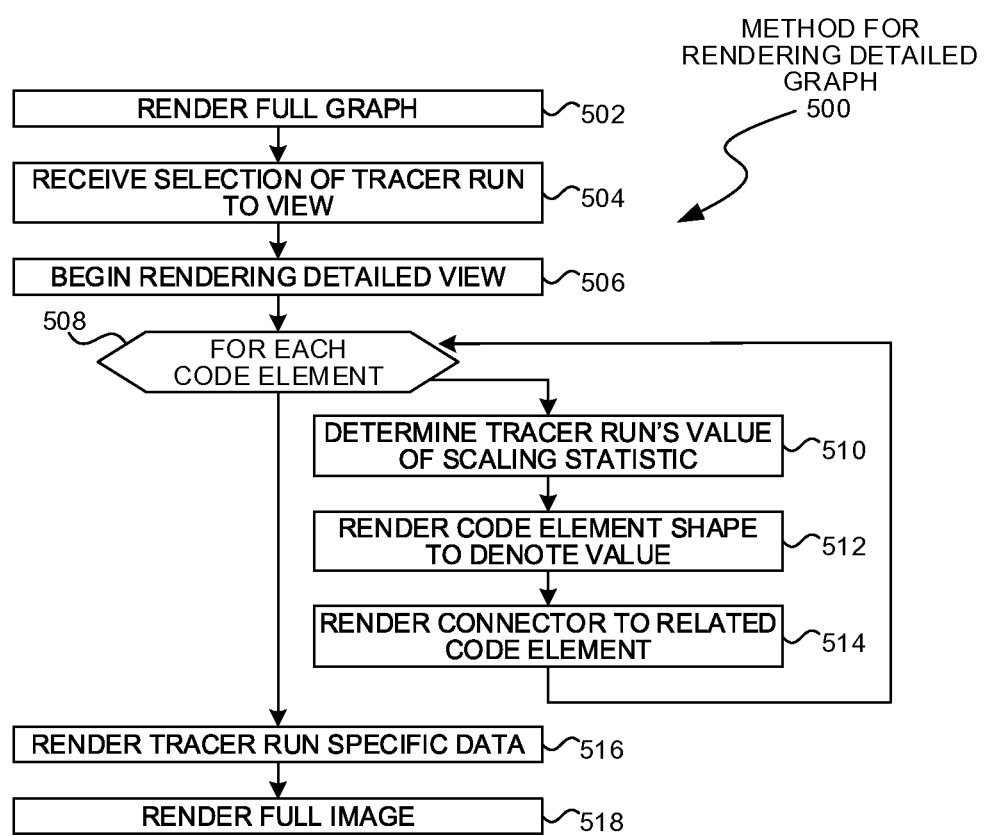
FIG. 5 is a flowchart illustration of an embodiment showing a method for creating an event chain diagram for a detailed view of a specific data set along with aggregated information in sub-graphs.

FIG. 5 is a flowchart illustration of an embodiment 500 showing a method for changing from an aggregated view of the data to viewing a data set for a specific sequence. Embodiment 500 is an example method that may be performed in response to a user selection to change from an aggregated view to a specific view, such as may be illustrated in the change from the diagrams illustrated in FIG. 1A and FIG. 1B.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The full graph may be rendered in block 502. The full graph may be a representation of a data set aggregated from multiple tracer runs. An example of creating such a graph may be found in embodiment 400.

The graph may be an interactive graph, which may have various mechanisms to browse and select individual data sets. In the example of FIG. 1A, such a selection mechanism may include the detail window 124 and detail view 130. The selection of an individual data set to view may be received in block 504.

The rendering of a detail view may begin in block 506. For each code element in block 508, the value from the selected data set corresponding to the current code element may be determined. In block 510, the code element shape may be rendered to show the determined value. In many embodiments, the shape may be greyed out, dashed, or otherwise have a visual modifier applied. Examples of such an operation may be found in shape 136 in FIG. 1B, where the shape 136 may be rendered with section 138 greyed out. A connector may be rendered in block 514.

Additional data may be rendered in block 516. The additional data may be data specific to the selected individual data set. Examples of such additional data may be the CPU loading 158 and memory usage 160 in FIG. 1B.

The full image may be rendered in block 518 and presented to a user.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:
   receiving trace data gathered from an application, said application comprising monitored elements, said trace data comprising performance observations from said monitored elements;
   identifying a first monitored element and a second monitored element within said trace data, said first monitored element having a relationship with said second monitored element;
   creating a first geometric shape representing a first monitored element, said first geometric shape having a first dimension;
   determining a first value for said first dimension from an aggregation of a plurality of said performance observations, said first value representing a first observation of said plurality of said performance observations;
   creating a second geometric shape representing a second monitored element, said second geometric shape having said first dimension;
   determining a second value for said first dimension from an aggregation of a second plurality of said performance observations, said second value representing a second of said second plurality of said performance observations;
   creating a graphical connector connecting said first geometric shape and said second geometric shape; and
   rendering said first geometric shape, said second geometric shape, and said graphical connector.

2. The method of claim 1 further comprising:
   determining a curve representing said first plurality of performance observations in said first dimension; and
   rendering said curve within said first geometric shape.

3. The method of claim 2, said curve being a line graph.

4. The method of claim 2, said curve being variable shading within said first geometric shape.

5. The method of claim 1, said first dimension representing time.

6. The method of claim 1, said first dimension representing resource utilization.

7. The method of claim 6, said resource utilization being one of a group composed of:
   memory resource utilization;
   processor resource utilization; and
   network resource utilization.

8. The method of claim 1, said first geometric shape being a rectangle.

9. The method of claim 8, said first dimension being a horizontal length of said rectangle.

10. The method of claim 8, said first dimension being a vertical length of said rectangle.

11. The method of claim 1, said first observation being a maximum observation of said plurality of said performance observations.

12. The method of claim 1, said first observation being one of a group composed of:
    minimum observation;
    average observation; and
    median observation.

13. The method of claim 1, said relationship being a sequential relationship between said first monitored element and said second monitored element.

14. The method of claim 1, said relationship being a dependency relationship between said first monitored element and said second monitored element.

15. The method of claim 1, said relationship being a shared memory object relationship between said first monitored element and said second monitored element.

16. A system comprising:
    a processor;
    a rendering engine executing on said processor, said rendering engine that:
      receives trace data gathered from an application, said application comprising monitored elements, said trace data comprising performance observations from said monitored elements;
      identifies a first monitored element and a second monitored element within said trace data, said first monitored element having a relationship with said second monitored element;
      creates a first geometric shape representing a first monitored element, said first geometric shape having a first dimension;
      determines a first value for said first dimension from an aggregation of a plurality of said performance observations, said first value representing a first observation of said plurality of said performance observations;
      creates a second geometric shape representing a second monitored element, said second geometric shape having said first dimension;
      determines a second value for said first dimension from an aggregation of a second plurality of said performance observations, said second value representing a second of said second plurality of said performance observations;
      creates a graphical connector connecting said first geometric shape and said second geometric shape; and
      renders said first geometric shape, said second geometric shape, and said graphical connector.

17. The system of claim 16, said rendering engine that further:
    determines a curve representing said first plurality of performance observations in said first dimension; and
    displays said curve within said first geometric shape.

18. The system of claim 17, said curve being a line graph.

19. The system of claim 17, said curve being variable shading within said first geometric shape.

20. The system of claim 16, said first dimension representing time.

21. The system of claim 16, said first dimension representing resource utilization.

22. The system of claim 21, said resource utilization being one of a group composed of:

memory resource utilization;
processor resource utilization; and
network resource utilization.

23. The system of claim 16, said first geometric shape being a rectangle.

24. The system of claim 23, said first dimension being a horizontal length of said rectangle.

25. The system of claim 23, said first dimension being a vertical length of said rectangle.

26. The system of claim 16, said first observation being a maximum observation of said plurality of said performance observations.

27. The system of claim 16, said first observation being one of a group composed of:
   minimum observation;
   average observation; and
   median observation.

28. The system of claim 16, said relationship being a sequential relationship between said first monitored element and said second monitored element.

29. The system of claim 16, said relationship being a dependency relationship between said first monitored element and said second monitored element.

30. The system of claim 16, said relationship being a shared memory object relationship between said first monitored element and said second monitored element.

* * * * *